United States Patent
MacLaurin

(10) Patent No.: US 7,328,407 B2
(45) Date of Patent: Feb. 5, 2008

(54) AUTOMATIC VIEW SELECTION

(75) Inventor: Matthew B MacLaurin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 10/960,806

(22) Filed: Oct. 7, 2004

(65) Prior Publication Data

US 2006/0080269 A1    Apr. 13, 2006

(51) Int. Cl.
*G06F 5/00* (2006.01)
*G06F 13/00* (2006.01)

(52) U.S. Cl. ...................... 715/744; 715/866
(58) Field of Classification Search ........ 715/728–751, 715/713–723, 799–805, 866
See application file for complete search history.

(56) References Cited

U.S. PATENT DOCUMENTS

| | | | |
|---|---|---|---|
| 5,878,410 A | 3/1999 | Zbikowski et al. | |
| 6,061,695 A | 5/2000 | Slivka et al. | |
| 6,232,968 B1 | 5/2001 | Alimpich et al. | |
| 2003/0020730 A1* | 1/2003 | Hodgson et al. | 345/619 |
| 2004/0181543 A1* | 9/2004 | Wu et al. | 707/102 |

OTHER PUBLICATIONS

M. Duecker, W. Mueller and J. Rubart, VIPspace—A Visually Programmable Shared Workspace, 1998, 2 pages, Proceedings of the IEEE Symposium on Visual Languages.
S.F. Roth, et al., Visage: A User Interface for Exploring Information, 1998, 8 pages, In Proc. of Information Visualization, IEEE.
R. De Chiara, U. Erra and V. Scarano, A Visual Adaptive Interface to File Systems, May 2004, pp. 366-369, Proceedings of the Working Conference on Advanced Visual Interfaces.

* cited by examiner

*Primary Examiner*—Cao (Kevin) Nguyen
(74) *Attorney, Agent, or Firm*—Amin, Turocy & Calvin, LLP

(57) ABSTRACT

A data system user interface that can employ different data collection renderers (e.g., views) based on an attribute of the content of a view-set (e.g., list, folder, directory) is provided. In accordance with aspects of the subject invention, views that are suitable to present certain types of content can be automatically selected. This automatic selection can employ the use of more specialized, optimized views based on the content of the view-set. The contents of the view-set can be analyzed and matched against an extensible set of view selection rules. It will be understood that, although the custom view can have a completely different visual appearance from the standard, default and/or generic view, the subject invention enables custom views to run within the same window as the standard view.

35 Claims, 8 Drawing Sheets

AUTOMATIC VIEW SELECTION

TECHNICAL FIELD

This invention is related to computer systems and more particularly to a system and method to instantiate a custom view-set renderer in accordance with a specified criteria and/or rule(s).

BACKGROUND OF THE INVENTION

Computer users today manage an increasingly large set of items, including their own documents, web-based contents, database search results, etc. Current user interface mechanisms are not designed to deal well with such large working sets. Although some user interface systems today are capable of providing specialized views which partially alleviate this problem, the user is generally responsible for locating and applying these specialized views. Even in systems which may select a "default view"—such as a photo view, there is no facility for composing a multitude of specialized views.

Thus a need exists for a system that addresses both of these issues. First, a system that analyzes data prior to its display and dynamically selects the most helpful and appropriate view based on a variety of environmental parameters is needed. Secondly, an unmet need exists for a system that allows for arbitrary and recursive combinations of specialized views, providing a broad space of both user-guided and rule-guided composite specialized views. Such a mechanism (e.g., via management applications) can automatically provide a user with a clear and comprehensive depiction of the contents.

Recently, rule-based systems and applications have emerged to personalize and/or customize applications in an effort to streamline efficiencies related to computing techniques. However, rule-based systems have not been applied to collections of data and/or view-set management applications.

Conventionally, computer systems and applications employ a standard and/or default rendering technique (e.g., standard detail list view) to present contents of a data collection and/or file system to a user. This default list view merely provides a limited listing of programs and/or files. For example, in one implementation, an alphabetical list is provided which is categorized by application name without regard to a specific file type. By way of further example, a user could manually customize or sort the list in a number of ways including, by file type, alphabetically, size, date, etc.

In this regard, many computer programs and applications provide a mechanism to allow a user to deviate from the default view thereby manually selecting a more specialized method to display the contents of a file system or data store (e.g., view-set). In other words, traditional desktop operating system environments allow a user to manually select from different views each of which displays directory contents in a different way. By way of example, a user can choose an icon view to display a directory in a manner that presents icons depicting specific file types. This icon view presents a small or large icon of the file type as manually specified by the user. In another example, a thumbnail view could be manually selected and thereby employed to display a directory containing image files. This view renderer presents a thumbnail image of each image file in a directory (e.g., view-set). Such existing viewers have the limitation of being homogenous. For example, only one view-set-renderer can be applied to a given view-set. As well, there is not facility for composition of view-set-renderers to different sections of a given view-set.

In addition to the need to customize and/or personalize view selection schemes based upon user preference or application type, advances in technology and hardware support a need to further manipulate view schemes in accordance with hardware constraints. Technological advances in communication devices equipped with computing power (e.g., smart-phones, personal digital assistants (PDAs)) support the need to provide for a system and/or method to present data in relation to the specifications of hardware devices and/or displays. By way of example, the specifications of a PDA display greatly impact the limitations of a view-set renderer as compared to a desktop personal computer (PC) equipped with a 19-inch monitor.

Although conventional systems provide limited ability to manually select pre-defined renderers of view-sets, there is a substantial unmet need to provide a system and/or methodology that allows a user to customize and select presentation characteristics (e.g., view-set renderer) to dynamically and automatically display the contents of a data store (e.g., view-set). Because the invention provides a wide variety of specialized view-set renderers, there is a growing need for the system to automatically select view-set renderers based on the characteristics of the view-set and the display environment. Moreover, in addition to standard desktop PC's, there is an unmet need to apply this functionality to today's continually emerging portable communications devices.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Collections of data, such as file system directories or search results, (e.g., view-sets) can be presented in a uniform manner without regard for the attributes (e.g., size or type) of their contents. The subject invention disclosed and claimed herein, in one aspect thereof, comprises a data system user interface (UI) that can provide different data renderers (e.g., views) based on an attribute of the content of a view-set (e.g., list, folder, directory, search result). In accordance with aspects of the subject invention, views that are suitable to present certain types of content can be automatically selected. This automatic selection can employ the use of more specialized and optimized views based on the content of the view-set. The contents of the view-set can be analyzed and matched against an extensible set of view selection rules. It will be understood that, although the custom view can have a completely different visual appearance from the standard, default and/or generic view, the subject invention enables custom views to run within the same window as the standard view.

In one aspect of the invention, a system that facilitates presenting data is provided. The system can include an analyzer component that determines a characteristic of the content of a view-set component. It will be appreciated that the characteristic can be any view-set attribute. By way of example, the characteristic can include, but is not limited to, a file type, size, origination date, location, etc. It will further be understood that a file type can include any electronic file type known in the art including but, not limited to word processing, text, image, spreadsheet, audio documents or the like.

The system can further include a view selection component that automatically selects a renderer (e.g., view) as a function of the characteristic. The renderer can facilitate automatically presenting the content, or subset thereof, of the view-set component. It is contemplated that all or a portion of the content can be rendered (e.g., displayed) to a user via a display or other visual device.

In yet another aspect thereof, the content of a view-set can include a query result. For instance, a view-set can include the results of an Internet or any database search. In the case of an Internet search, it will be appreciated that the content of the view-set can include the results of the query in the form of hyperlinks or the like.

In still another aspect of the subject invention, a view selection component can employ a rule-based decision mechanism. In accordance thereto, a rule engine component that automatically selects a rule can be provided. Additionally, a rule evaluation component that applies the rule as a function of the characteristic to select a renderer can be provided. It will be appreciated that the rule engine component can be located remotely from the rule evaluation component or any other component of the system.

In another alternative aspect, an artificial intelligence (AI) component that predicts a user intention as a function of historical user criteria can be provided in place of, or in addition to, the rule-based decision components. The AI component can include an inference component that facilitates automatic selection of a renderer as a function of the user intention with respect to the characteristic. The inference component can employ a utility and/or statistical based analyses in performing the automatic selection. Furthermore, the view selection component can dynamically select the renderer as a function of a state of an application or other component.

In still another aspect, the system can be recursive in operation. For example, the content of the view-set component can include one or more sub-view-set components. The analyzer component can determine a sub-view-set characteristic in accordance with the sub-view-set component. In accordance thereto, the view selection component can dynamically and automatically select a sub-view-set rendering as a function of the sub-view-set characteristic to render at least a subset of the sub-view-set component.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
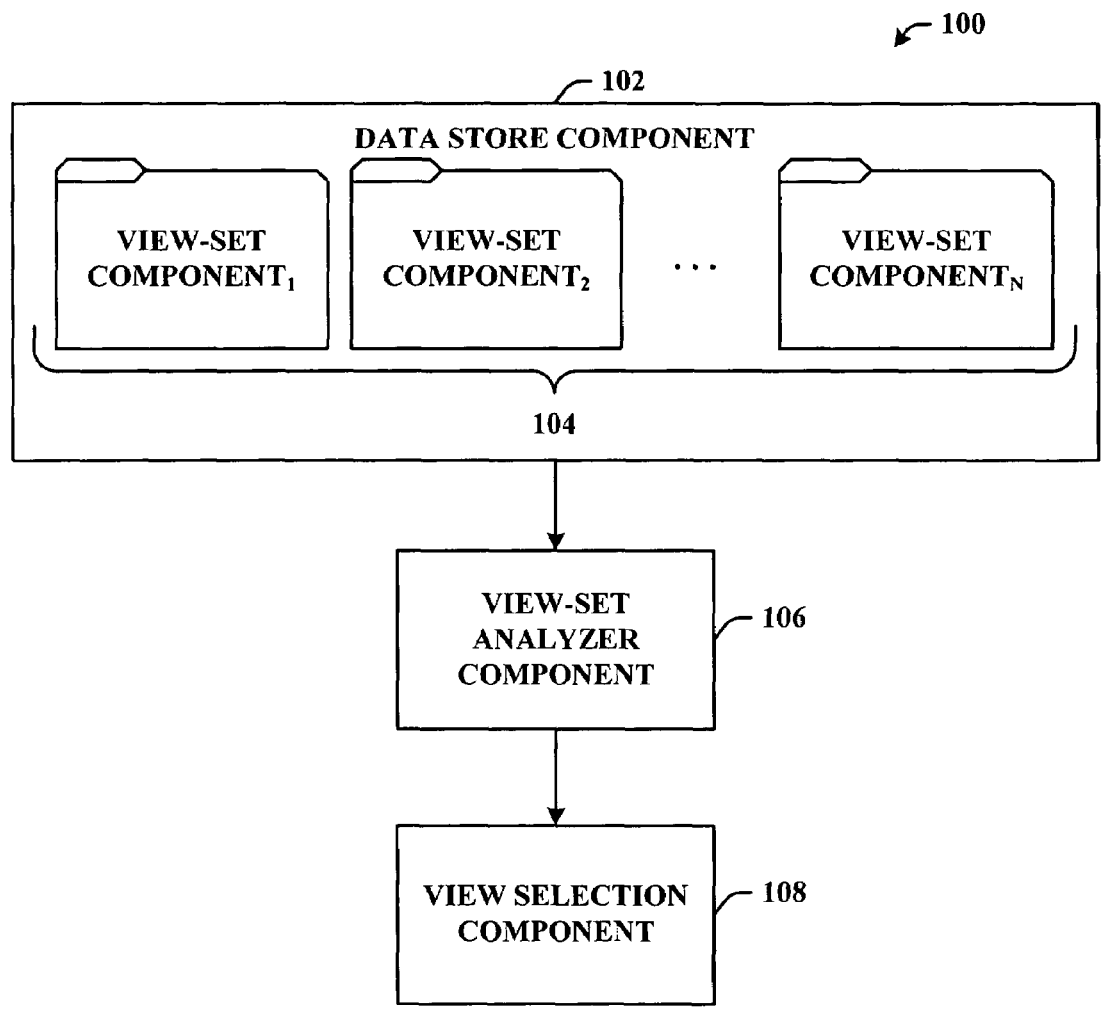
FIG. 1 illustrates a general component block diagram of a system for presenting data in accordance with an aspect of the invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In accordance with the subject invention, the display of the contents (e.g., files, folders, query results) within in a view-set can be specialized based on any desired criteria (e.g., metadata, file type, size, date). By way of example, the presentation of information can be based upon the type and/or number of items being displayed. As will be appreciated, the systems and methodologies described herein can effect a display area to be used more efficiently. This invention can be particularly useful in light of the emerging handheld devices which employ smaller and more compact display systems. As well, the systems and methodologies disclosed herein can assist a user to more quickly and efficiently identify the contents of various directories and/or files by displaying the contents in a more comprehensive manner than conventional systems.

As discussed supra, contemporary desktop operating system environments allow a user to manually select from a limited number of predefined views, each of which displays directory contents in a different manner. In various aspects of the subject invention, specialized view-set renderers (e.g., view) can be selected dynamically and/or automatically based on any desired criteria (e.g., metadata, file type, size, age). In other words, view-set renderers that are suitable for certain types of files can be automatically selected thus allowing for the use of more specialized and optimized views based on the content that is to be presented.

Referring now to FIG. 1, there is illustrated a schematic representation of an aspect of a system 100 that facilitates data presentation in accordance with the subject invention. Generally, the system 100 can include a data store component 102 having view-set component(s) 104 therein. Further, the system 100 can include a view-set analyzer component 106 and a view selection component 108.

The data store component 102 can include view-set components 1 to N, where N is an integer. View-set components 1 to N can be referred to collectively or individually as view-set components 104 as illustrated. View-set component 104 can be any compilation of and can include any number of electronic items, records or documents. By way of example, view-set component 104 can be a single document, list, folder, directory, query result or the like. Moreover, it is to be understood that view-set component 104 can include one or multiple electronic files or documents of diverse file types (e.g., spreadsheet, word processing, image, text, hyperlink). It will be appreciated that view-set component 104 can alternatively include a sub-view-set(s) therein.

One aspect of the subject invention is directed to a system and method whereby desktop operating system user interfaces (UIs) can facilitate the presentation of the contents by a renderer (e.g., view) of various view-sets 104 (e.g., directories, lists). As previously discussed, in conventional systems, view-sets 104 were usually presented in either a default or manually selected scheme without regard to application and/or user preference(s). In contrast and in accordance with various aspects, the subject system and/or methodology can dynamically and/or automatically invoke custom (e.g., user/application defined or predetermined) view-set renderers (e.g., views) with respect to specific data systems thereby presenting the contents in a user-friendly, comprehensive and efficient manner.

The system 100 can further include a view-set analyzer component 106 that can facilitate determination of a characteristic (e.g., metadata, file type, file size) from the view-set component 104. The determined characteristic can be utilized by the system 100 in the selection of a custom view-set renderer (e.g., view). It will be appreciated that the functionality of the view-set analyzer component 106 can be integrated into other evaluation or decision-making components included within the view selection component 108. These alternate aspects will be discussed in greater detail infra.

Finally, the view selection component 108 can be configured to select an appropriate view-set renderer or view (e.g., list, thumbnail, filmstrip) in accordance with the output (e.g., characteristic) of the view-set analyzer component 106. In other words, based upon the boundary and contents of the view-set 104, the view selection component 108 can automatically choose a renderer (e.g., view) to comprehensively present the view-set component 104. As will be later discussed, the view selection component 108 can be configured to base a selection upon any desired criteria available. By way of example, the view selection component 108 can be configured to select a renderer (e.g., view) based upon a file type. For instance, suppose a view-set component 104 contains three word processing documents and five image files. The system can be pre-configured or programmed to automatically select a filmstrip view based upon a majority of the files being image files. Likewise, if three image files are subsequently removed leaving three word processing files and two image files, the system can dynamically present the contents using a tile view that illustrates a tile to identify the file type of each document. It is to be appreciated that this situation is exemplary and that any desired custom view and/or criteria can be employed in accordance with the present system.

Referring again to the exemplary aspect of FIG. 1, once a set of particulars and/or characteristics of the contents of the view-set component 104 are determined (e.g., via view-set analyzer component 106), the system 100 can be configured to employ the view selection component 108 to automatically select and instantiate an appropriate renderer based upon the specific file types contained within the view-set component 104. In the exemplary situation, the view selection component 108 can be configured to implement a combination thumbnail view of the image files together with an icon view of the word processing documents. Alternatively, the view selection component 108 can be automatically configured to invoke a filmstrip view as a result of a majority of the files in the subject view-set component 104 being image files. Although specific examples and aspects are discussed herein, it is to be understood that any number of optional views and/or decision schemes can be employed and are to be considered within the scope and functionality of the claimed invention.

In alternative aspects and by way of further example, the view selection component 108 can be configured with a decision-making mechanism in the form of a rule engine whereby a rule can be applied to the view-set component 104 thus automatically selecting an appropriate view component. In an alternate aspect, an artificial intelligence component can be employed individually or in combination with other evaluation schemes in order to effect view selection based upon contents of a view-set. These alternative aspects will be discussed in greater detail infra.

Further, it is to be understood that the systems and methodologies described herein can be effected in a recursive manner. In other words, the view-sets 104 can be dynamically and/or automatically customized at any level within the data store component 102 or view-set 104. Accordingly, sub-lists or sub-view-sets can be contained within parent lists whereby the components (e.g., 106, 108) described supra can facilitate automatic view selection of a customized view at the subordinate level. By way of example, the view selection component 108 can look at the boundary of the view-set component 104 and select an appropriate renderer (e.g., view). In the event the selected renderer determines that the view-set contains an additional or sub-view-set (e.g., list, folder, query), the view selection component 108 can be re-invoked whereby an appropriate renderer can be selected to present the additional view-set. It is contemplated that the rendering functionality of the subject invention can be applied to present (e.g., render) a view-set or contents of a view-set to a user or other entity (e.g., application, component, module).

In another alternate aspect, the view selection component 108 can be configured to dynamically select a renderer (e.g., view) with respect to a type and/or state of an application. By way of example, suppose a user is employing a word processing application. The subject invention can be configured to facilitate selection of a custom view based upon the application or state within the application. In other words, if a user selects to insert or open a file within the application, the system can dynamically select a filmstrip or document view to assist in the insert/open operation in accordance to an image or text file respectively. This automated determination can select an appropriate view based upon a file type to comprehensively and efficiently aid the user in selecting the appropriate file(s) to open or insert.

It will be appreciated that automatically selecting the appropriate view can reduce the burden on a user to decide which view will be most efficient in light of the view-set contents. As well, dynamic selection can reduce the amount of user interface thereby eliminating potential error conditions or sub-optimal user experience and/or performance which can result from incorrect view selection.

Figure 2:
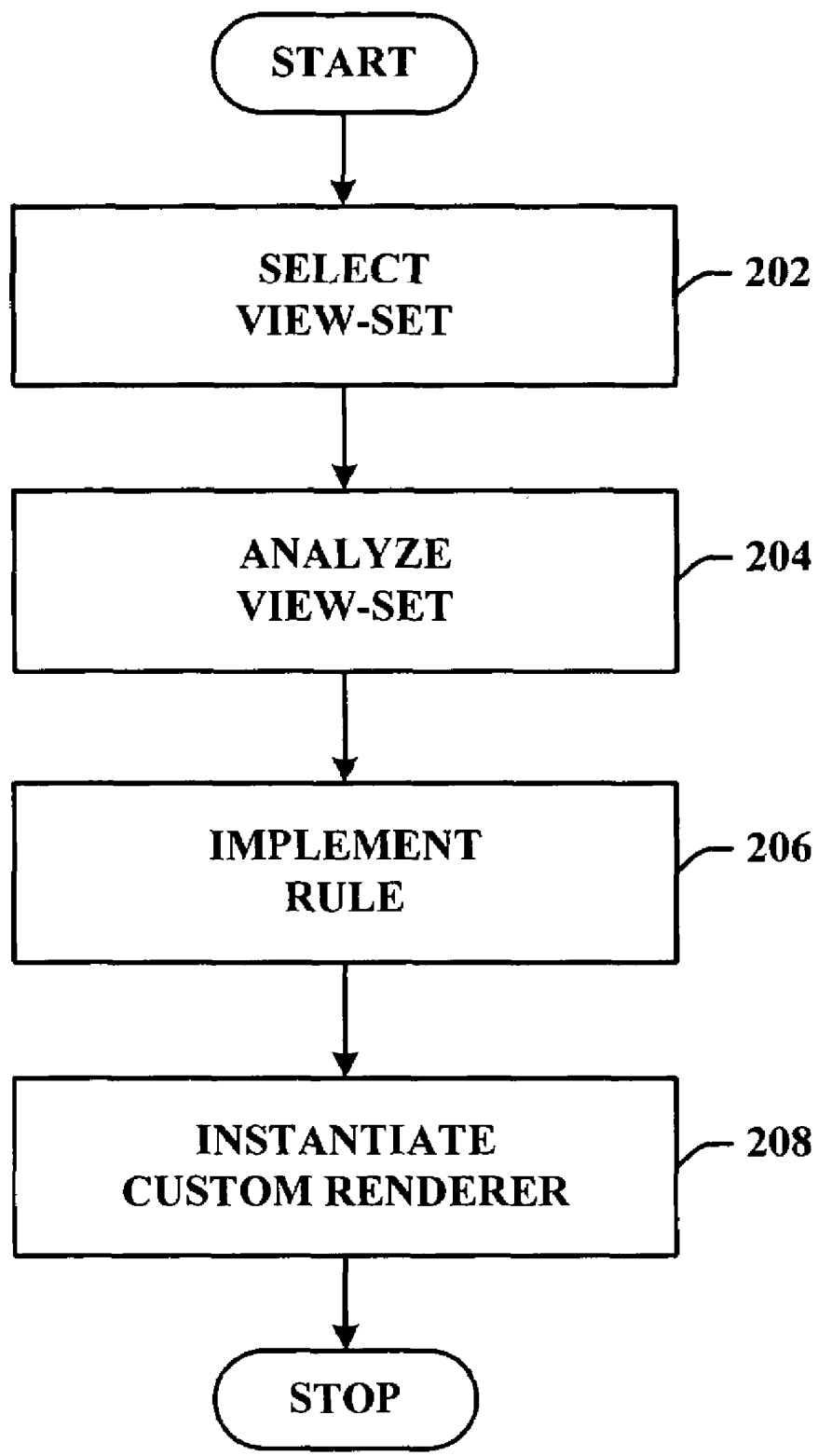
FIG. 2 illustrates an exemplary flow chart of procedures to select a view-set and render the content of the view-set in accordance with a disclosed aspect.

Referring now to FIG. 2, there is illustrated a flow chart in accordance with an aspect of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring to FIG. 2 and proceeding to 202, a view-set (e.g., list, folder, query) is selected. In accordance with the subject invention, it is to be appreciated that a view-set can be manually or automatically selected. By way of example, the view-set can be manually selected by a user or automatically selected via an application or other system component. At 204, the view-set is analyzed to determine its contents and characteristics thereof. As discussed supra, the functionality of analyzing the view-set can reside in a separate component as illustrated in FIG. 1 or can alternatively be combined within the functionality of another component (e.g., view selection component). In either case, at 204, a determination is made of the contents including other characteristics of the view-set.

Once analyzed, an implementation scheme (e.g., rule) can be applied at 206 to identify an appropriate renderer (e.g., view) in accordance with the contents and/or characteristic(s) of the view-set. It will be appreciated that the rule-based implementation to automatically and/or dynamically select a view can employ a predefined and/or programmed rule(s) based upon any desired criteria (e.g., file type, file size, hardware characteristics). By way of example, a user can establish a rule that selects a preferred view in accordance with a variety of predetermined circumstances.

In an exemplary aspect, a rule can be constructed to implement a filmstrip or thumbnail view when the contents of a view-set are, or a majority of the contents are, image files. In another aspect, a rule can be constructed to employ a historical detail or list view in the event that the creation date of the newest to the oldest document exceed a predefined threshold. In accordance with the disclosed aspects, it is to be appreciated that a "list" (e.g., view-set) can reside within a database component. As such, it is contemplated that the invention can facilitate access to additional information (e.g., rich metadata) whereby this additional information can be employed to assist in the dynamic determination and/or refinement of an appropriate renderer. For instance, suppose a user desires to display music files. The system can automatically determine an appropriate view (e.g., thumbnail of album cover). Further, because the system can reside in a database environment, it will be appreciated that the system can automatically refine and/or obtain additional information as a result of a chosen view. In the exemplary scenario, the system can further refine by obtaining an image of the artist or additional tracks consistent with an subject artist. In any case, it is to be appreciated that the system is capable of refining a view via a query.

Once identified, the system can instantiate the custom renderer at 208 to present the contents of the view-set. In accordance with the subject invention, it is to be appreciated that the presentation of the contents of a view-set discussed herein can be accomplished in any desired manner. By way of example, the contents can be presented directly to a user via a display or monitor. As well, the contents can be rendered to an application whereby, in accordance with other factors (e.g., handheld display size), the rendered presentation can be modified (e.g., scaled) to conform to predetermined specifications. Thus, the scaled view can then be displayed to a user via a handheld display device.

Figure 3:
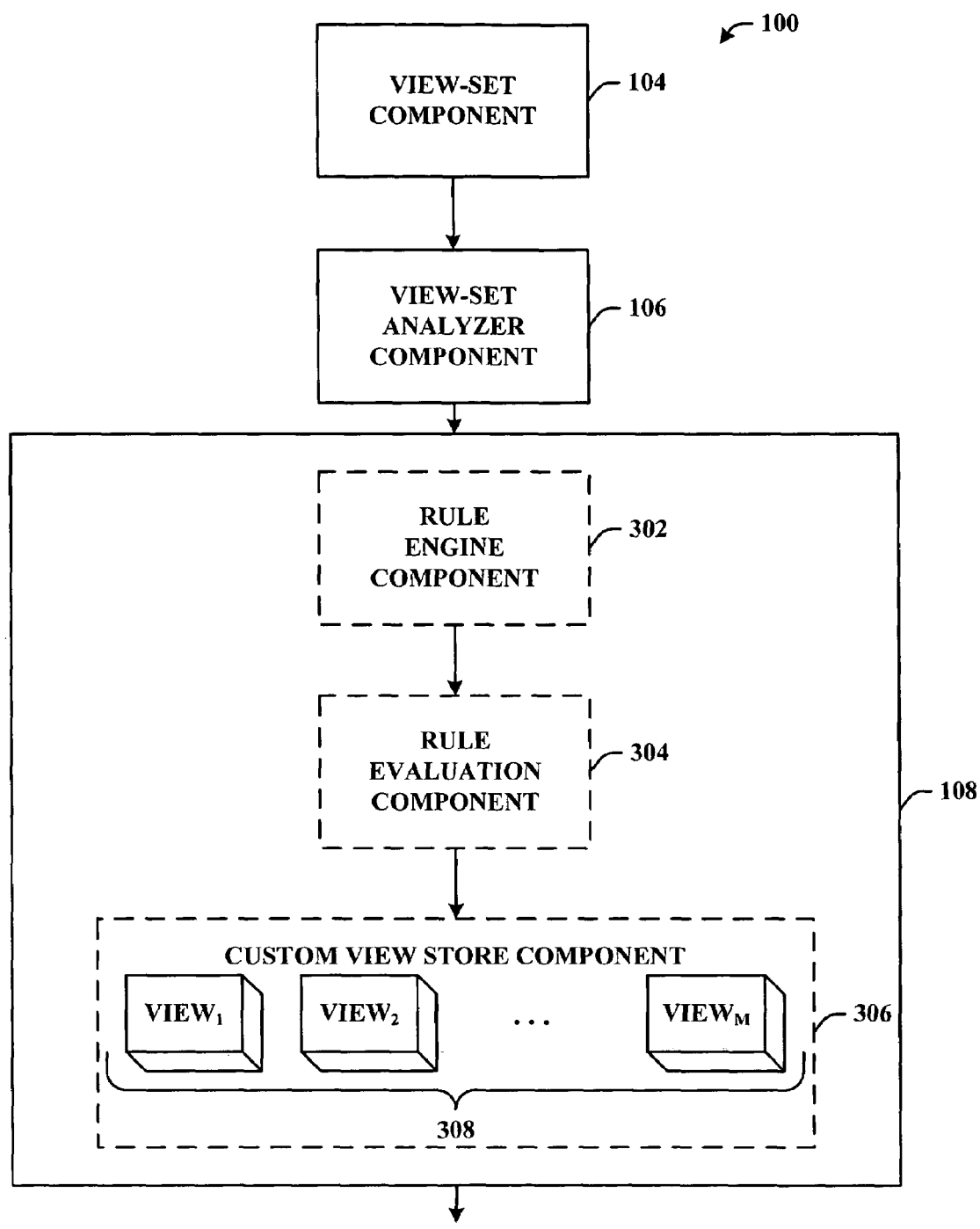
FIG. 3 illustrates a network architectural diagram that exemplifies representative rule-based view selection components in accordance with a disclosed aspect.

Continuing with the example and with reference to FIG. 3, a more detailed schematic view of a view selection component 108 is shown. As illustrated, view selection component 108 can generally include a rule engine component 302, a rule evaluation component 304 and a custom view store component 306. Custom view store component 306 can include views 1 to M, where M is an integer. It is to be appreciated that views 1 to M can be referred to individually or collectively as view 308. Additionally, it is to be appreciated that views 308 can be retained in any technique known in the art. By way of example, views 308 can be retained utilizing any memory device including, but not limited to, buffered, cached, stored on a hard disk device or the like. As will be discussed infra, an optional artificial intelligence component (not shown) can be used together with, or in place of, the rule engine component 302 to automatically infer a rule.

In the exemplary aspect of FIG. 3, the rule engine component 302 can be programmed or configured in accordance with a user-defined preference. As well, a rule can be established in accordance with a specific hardware configuration, in accordance with a software application, existing parent view (if being invoked recursively on a subview) or in accordance with any other environmental parameter, such as the current user. For example, a rule can be constructed in accordance with specific memory capacity and/or display mechanism of a device. In other words, as previously discussed, a rule can be established to take into consideration the specific limitations of a hardware device (e.g., display mechanism).

The rule evaluation component 304 facilitates application of the rule in accordance with the contents and characteristics determined by the view-set analyzer component 106. Based upon the output of the rule evaluation component 304, the view selection component 108 can select and invoke a custom view 308 from the custom view store component 306. It is to be appreciated that the custom view component

308 can be any desired view or arrangement which is known or becomes known in the art. By way of example, the custom view component 308 can facilitate presentation in any manner including, but not limited to, list, detail, filmstrip, fish-eye, slideshow, icon, web layout, hierarchical, chronological or the like.

Figure 4:
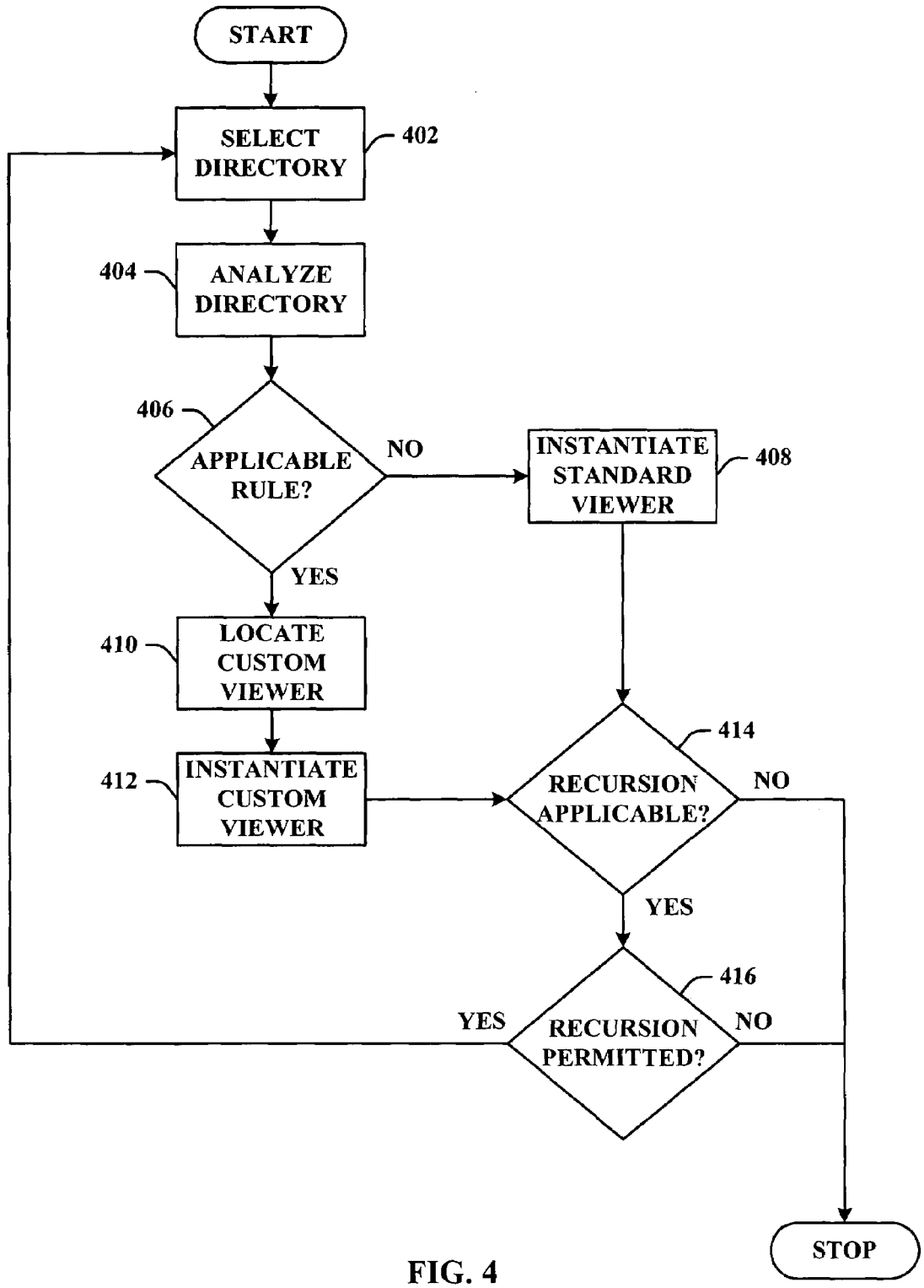
FIG. 4 illustrates an exemplary flow chart of procedures including recursive aspects of an alternate aspect.

For ease of understanding, FIG. 4, illustrates a flow chart of an exemplary methodology in accordance with an alternate aspect of the subject invention. Referring to FIG. 4 and proceeding to 402, a directory (e.g., view-set) is selected. As previously discussed, the selection of a particular view-set or directory can be manually initiated by a user. Although the exemplary aspect is directed toward a system whereby a user manually initiates the selection, it is to be appreciated that any method of selecting a particular view-set can be employed in accordance with the claimed invention. By way further example, a directory and/or view-set can be dynamically and/or automatically selected via a computer program or application. For instance, the view-set can be dynamically selected by a query component as a result of an Internet search or query.

At 404, the contents (e.g., files, hyperlinks, uniform resource locators (URLs)) of the view-set or directory are analyzed and matched against an extensible set of view selection rules. As previously discussed, this analyzing procedure can be performed by a view-set analyzer component 106 illustrated in FIG. 1. It will be appreciated that any suitable source code can employed to contrast a rule(s). By way of example, in an exemplary implementation, rules can be implemented in the form of any suitable computer language including, but not limited to T-SQL, C# source code or the like.

Based upon the contents of the view-set, or other desired attribute, at 406, the system determines if an applicable rule exists. If at 406 no rule is found to be applicable to the contents of the directory, a generic or standard renderer (e.g., view) can be selected and instantiated at 408. If, on the other hand, an applicable rule is found at 406, a custom renderer (e.g., view) can be selected at 410 in accordance with the applicable rule. If more than one applicable rule is found, the rules can be ranked according to the specificity of the rule and the highest ranking (most specific) rule can be selected. Next, the custom renderer or view can be instantiated at 412.

In either case, whether a custom or standard view is instantiated at 412 or 408 respectively, the system next determines if the recursive functionality of the invention is applicable at 414. The recursive functionality is applicable if there are natural subgroupings of the data (such as a sub-directory if viewing a file system) or if the current custom viewer specifically expresses recursion. For example, in the case of a collection of photographs, documents, and videos, the most applicable rule could select a "media library view" the media library view could in turn group the view-set according to type (photograph, etc.) and then recurse on these sets. The result would be a "media library view" which contained, as subviews, a "photograph view", a "video view" and a "document view". It will be appreciated that there are many situations in which such recursive view construction is applicable. Once such applicability is determined, the system determines at 416 whether it is permitted. A user, for example, may indicate that sub-directories are not to be expanded. If present and requested, the system returns to 402 to select the directory and appropriate renderer. If a sub-directory is not present and/or not requested, the system methodology ends as illustrated. Those skilled in the art will understand that because the implementation disclosed herein supports hierarchical and/or nested views, the methodologies described can be repeated recursively as discussed supra.

It is to be appreciated that although the custom view can employ a completely different visual appearance from the standard view, it can run inside the same window as the standard or generic view(s) and vice versa. Additionally, the system can adapt the custom view to conform to specific hardware or desired criteria. By way of example, the system can be configured to dynamically select a photographic filmstrip view thereby adapting the view to conform to a target device. It will be appreciated that because pictures can be primarily identified by their visual contents rather than their title or other ancillary data, the filmstrip view can pack or align pictures closer together thereby suppressing the display of their title(s). Although this alignment can allow a greater density of presentation for images or photographs, this view may not be suitable for a display mechanism of a portable device. An exemplary rule can activate this filmstrip view when all, or a majority, of the contents of a directory are image files and the target device is capable of displaying such a rendered presentation. In the alternative, the rule can be configured to dynamically select and present the view-set via a substitute view which conforms with limited specifications of an alternate target device (e.g., PDA).

Figure 5:
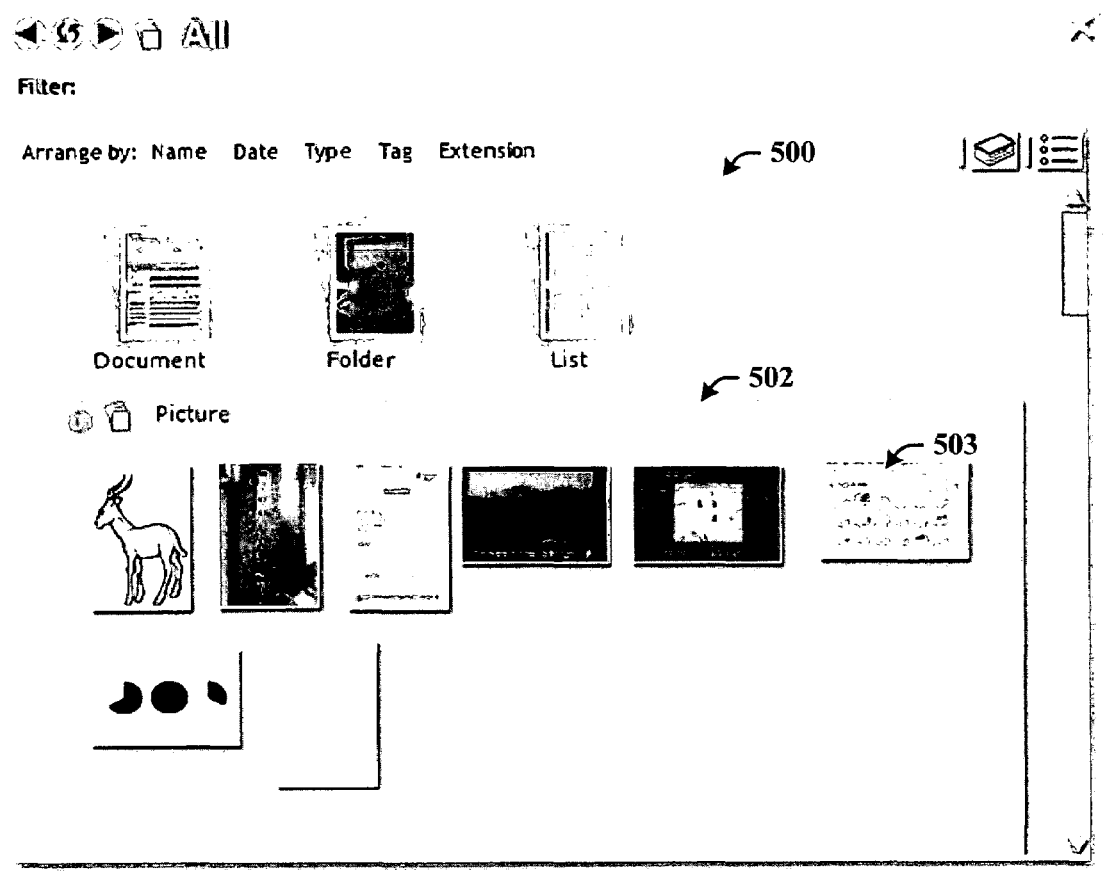
FIG. 5 illustrates an exemplary user interface (UI) view that exemplifies a focal view aspect in accordance with an aspect of the invention.

FIG. 5 illustrates an exemplary UI, renderer or view according to an alternate aspect of the subject invention. It is to be appreciated however, that the subject invention is not limited to the examples shown and described herein. Referring to FIG. 5, a query results page is illustrated. In accordance with an aspect of the subject invention, an exemplary query results display 500 is illustrated as a composite view. This type of view can be employed to effect presentation emphasis with regard to more detailed information with respect to a given search result. In this aspect, iconized views have been instantiated for each of the sub-groupings of data. For the "Picture," sub-group, however, a specialized "page" view (502) which shows all its members inline has been instantiated. Within that view, even more specific "photo" views (503) have been instantiated, which do not show the names of their items or any other details. In an alternate aspect, the results can be displayed utilizing a thumbnail image of the web page result.

Figure 6:
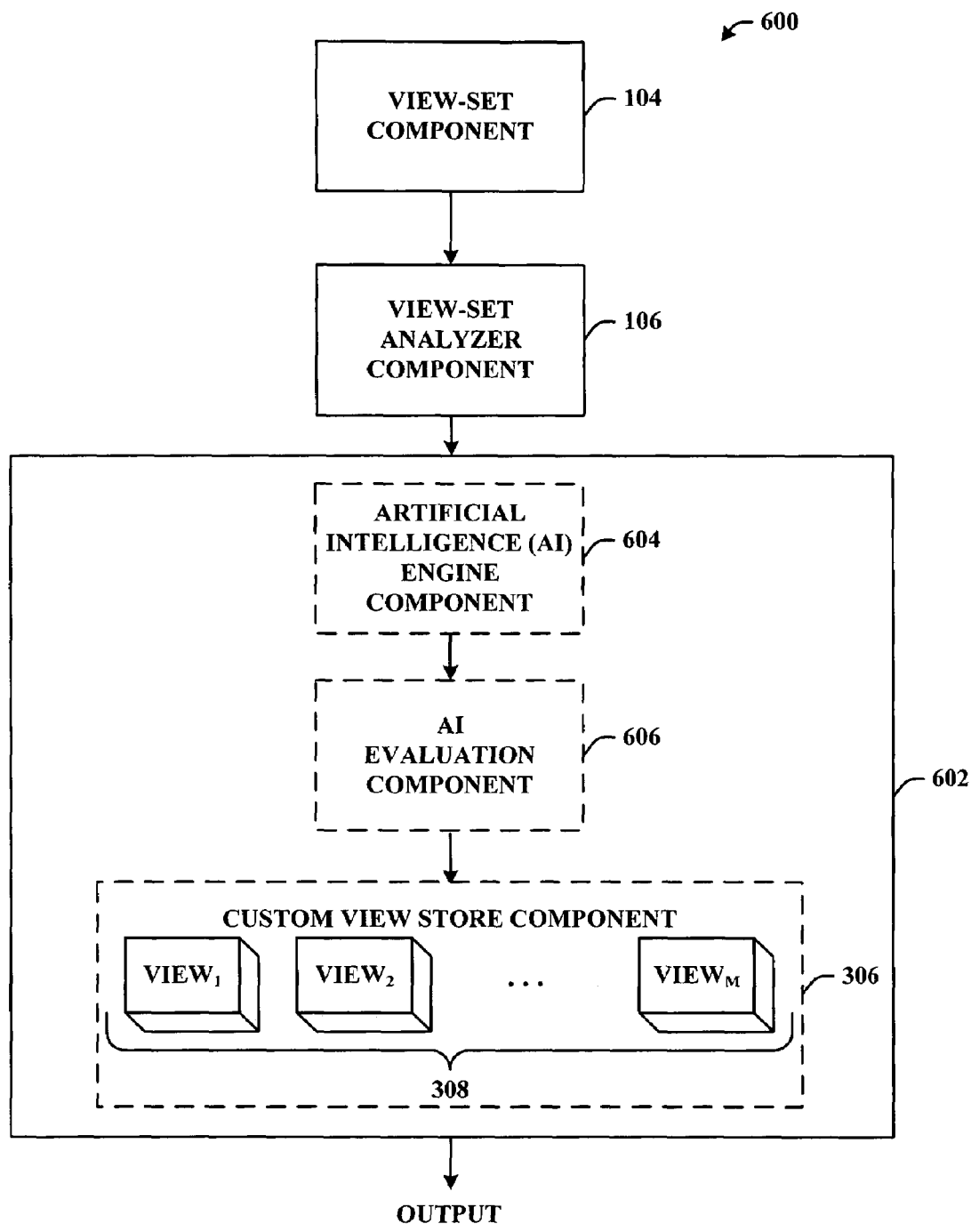
FIG. 6 illustrates a network architectural diagram that exemplifies representative artificial intelligence-based view selection components in accordance with a alternate aspect.

A schematic diagram of another aspect of the subject invention is illustrated in FIG. 6. Generally, FIG. 6 illustrates a system 600 including a view-set component 104, view-set analyzer component 106 and a view selection component 602. In particular, the view-set component 104 and the view-set analyzer component 106 have similar functionality as those discussed previously with reference to FIG. 1. On the other hand, the view selection component 602 of this aspect includes an artificial intelligence (AI) engine component 604, an AI evaluation component 606 and the custom view store component 306 having view component(s) 308 therein.

In accordance with this aspect, the optional AI engine and evaluation components 604, 606 can facilitate automatically performing various aspects (e.g., custom view selection, zoom in/out, scaling, arrangement) of the subject invention as described herein. The AI components 604, 606 can optionally include an inference component that can further enhance automated aspects of the AI component utilizing, in part, inference based schemes to facilitate inferring intended actions to be performed at a given time and state. The AI-based aspects of the invention can be effected via any suitable machine-learning based technique and/or statistical-based techniques and/or probabilistic-based techniques.

In this alternate aspect as illustrated by FIG. 6, the subject invention (e.g., in connection with selecting a custom renderer) can optionally employ various AI based schemes for automatically carrying out various aspects thereof. Specifically, an AI engine 604 and evaluation components 606 can optionally be provided to implement aspects of the subject invention based upon AI processes (e.g., confidence, inference). For example, a process for determining an appropriate renderer (e.g., custom view component 308) based upon contents of a view-set 104 can be facilitated via an automatic classifier system and process. Further, the optional AI engine 604 and evaluation components 606 can be employed to facilitate an automated process of configuration (e.g., scaling, zoom in/out) in accordance with hardware specifications.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of renderer selection, for example, attributes can be file types or other data-specific attributes derived from the file types and/or contents of a view-set, and the classes can be categories or other areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., näive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc., are contemplated and are intended to fall within the scope of the hereto appended claims.

Figure 7:
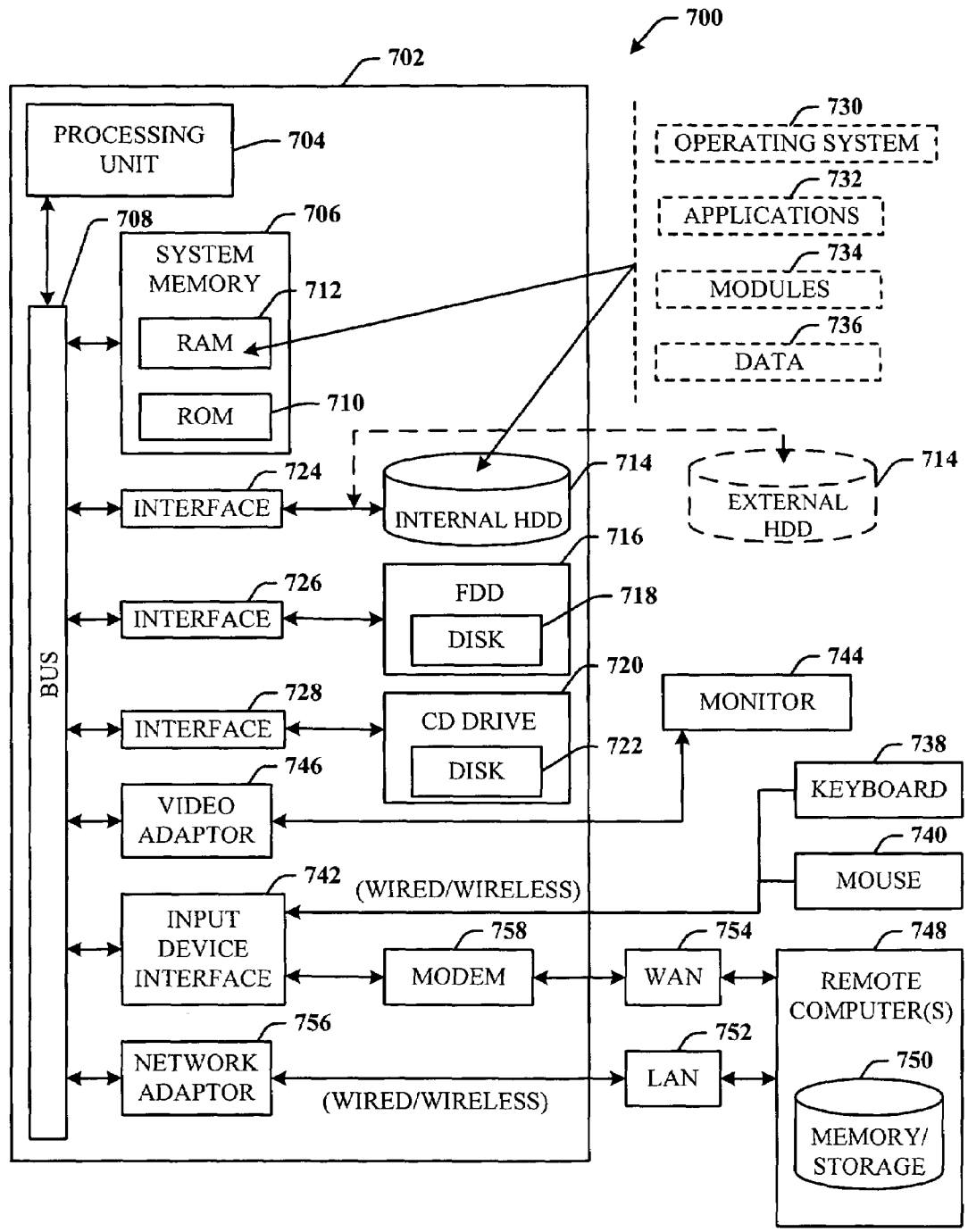
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the subject invention, FIG. 7 and the following discussion are intended to provide a brief, general description of a suitable computing environment 700 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, there is illustrated an exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the subject invention can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
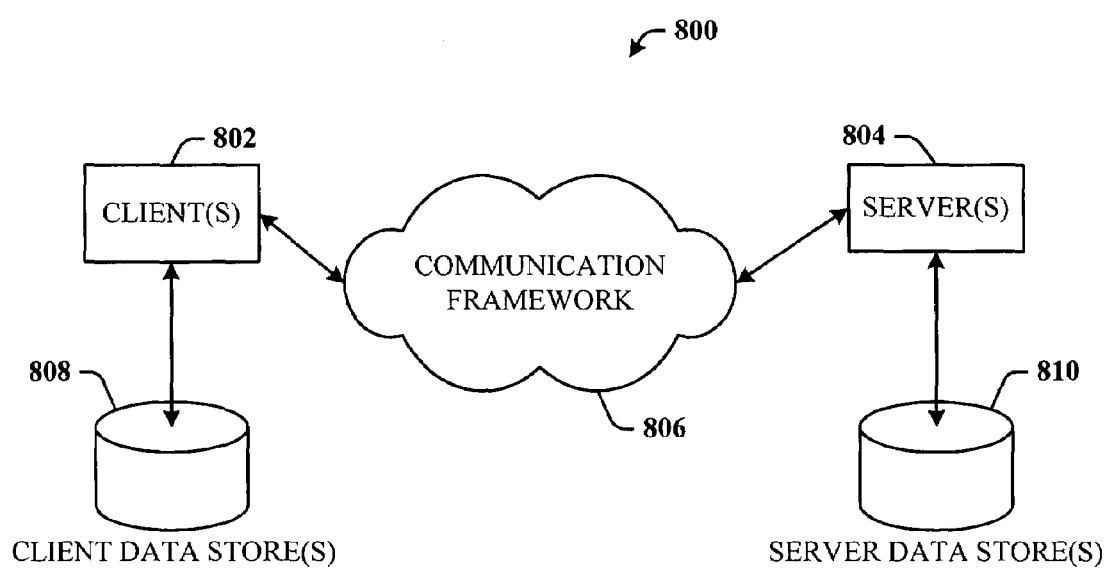
FIG. 8 illustrates a schematic block diagram of an exemplary computing environment in accordance with the subject invention.

Referring now to FIG. 8, there is illustrated a schematic block diagram of an exemplary computing environment 800 in accordance with the subject invention. The system 800 includes one or more client(s) 802. The client(s) 802 can be hardware and/or software (e.g., threads, processes, computing devices). The client(s) 802 can house cookie(s) and/or associated contextual information by employing the subject invention, for example. The system 800 also includes one or more server(s) 804. The server(s) 804 can also be hardware and/or software (e.g., threads, processes, computing devices). The servers 804 can house threads to perform transformations by employing the subject invention, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates presenting content of a view-set component, the system comprising:
   an analyzer component that determines a characteristic of the content;
   a view selection component that automatically selects a view for at least a subset of the content based on the characteristic; and
   a component that places the selected view on a user interface, wherein the content of the view-set component including a sub-view-set component, the analyzer component determines a sub-view-set characteristic of the sub-view-set component and the view selection component dynamically selects a sub-view-set renderer as a function of the sub-view-set characteristic to render at least a subset of the sub-view-set component.

2. The system of claim 1, the characteristic is a file type.

3. The system of claim 2, the file type is a word processor document.

4. The system of claim 2, the file type is an image document.

5. The system of claim 1, the characteristic is a file size.

6. The system of claim 1, the characteristic is a date.

7. The system of claim 1, the content includes a query result.

8. The system of claim 1, the content is an electronic document.

9. The system of claim 8, the electronic document is an image file.

10. The system of claim 8, the electronic document is a hyperlink.

11. The system of claim 1, the view-set component is remote from the analyzer component.

12. The system of claim 1, the view selection component comprising:
    a rule engine component that automatically selects a rule; and
    a rule evaluation component that applies the rule as a function of the characteristic to select the view.

13. The system of claim 12, the rule engine component is located remotely from the rule evaluation component.

14. The system of claim 1, further comprising an artificial intelligence (AI) component that predicts a user intention as a function of historical user criteria.

15. The system of claim 14, the AI component includes an inference component that facilitates automatic selection of the view as a function of the user intention with respect to the characteristic.

16. The system of claim 15, the inference component employs a utility based analyses in performing the automatic selection.

17. The system of claim 1, the view selection component dynamically selects the view as a function of at least one of a type of application and a state of the application.

18. A desktop computing system that employs the system of claim 1.

19. A portable computing device that employs the system of claim 1.

20. The system of claim 1, further comprising an intelligence component that employs a statistical-based analysis to infer an action that a user desires to be automatically performed.

21. A computer storage -readable medium having stored thereon computer executable instructions for carrying out the system of claim 1.

22. A method of presenting data, the method comprising:
    determining a characteristic of content of a view-set component including a sub-view set component including a sub-view characteristic;
    dynamically selecting a renderer as a function of the characteristic to automatically render at least a subset of the content of the view-set component; and
    place the rendering on a user interface, wherein a analyzer component determines a sub-view-set characteristic of the sub-view-set component and a view selection component dynamically selects a sub-view-set renderer as a function of the sub-view-set characteristic to render at least a subset of the sub-view-set component.

23. The method of claim 22, the characteristic is a file type.

24. The method of claim 22, further comprising selecting a rule to automatically determine the renderer.

25. The method of claim 24, further comprising instantiating the rule to automatically select the renderer.

26. The method of claim 22, further comprising rendering the subset of the content to a user.

27. The method of claim 22, further comprising predicting a user intention as a function of the characteristic.

28. The method of claim 27, the act of selecting the renderer is based upon the predicted user intention.

29. The method of claim 22, further comprising analyzing the view-set component to determine the characteristic.

30. A computer storage -readable medium having computer-executable instructions to perform the acts recited in claim 22.

31. A view selection system, the system comprising:
    means for analyzing one or more attributes of a view-set component including a sub-view set component including a sub-view characteristic;

means for dynamically selecting a view as a function of the one or more attributes; and means for placing the view on a user, wherein a analyzer component determines a sub-view-set characteristic of the sub-view-set component and a view selection component dynamically selects a sub-view-set renderer as a function of the sub-view-set characteristic to render at least a subset of the sub-view-set component.

32. The system of claim 31, further comprising means for automatically instantiating the view.

33. The system of claim 31, further comprising means for inferring a user intention.

34. The system of claim 31, further comprising means for displaying the content.

35. A computer storage -readable medium having stored thereon computer executable instructions for carrying out the system of claim 31.

* * * * *